United States Patent
Yuuki

(10) Patent No.: US 8,140,051 B2
(45) Date of Patent: Mar. 20, 2012

(54) LINK ESTABLISHMENT METHOD AND MOBILE COMMUNICATION SYSTEM

(75) Inventor: Shinji Yuuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 12/185,264

(22) Filed: Aug. 4, 2008

(65) Prior Publication Data

US 2009/0042597 A1 Feb. 12, 2009

(30) Foreign Application Priority Data

Aug. 7, 2007 (JP) .................................. 2007-205744

(51) Int. Cl.
 *H04M 11/04* (2006.01)
(52) U.S. Cl. ............... 455/404.2; 455/456.1; 455/456.5; 714/26
(58) Field of Classification Search ............... 455/404.2, 455/456.1, 456.5, 16, 524, 525, 561; 714/26; 342/368
See application file for complete search history.

(56) References Cited

U.S. PATENT DOCUMENTS

| | | | | |
|---|---|---|---|---|
| 5,289,527 | A * | 2/1994 | Tiedemann, Jr. | 455/435.1 |
| 5,708,441 | A * | 1/1998 | Kanai | 342/359 |
| 6,021,329 | A * | 2/2000 | Kornestedt et al. | 455/446 |
| 6,085,335 | A * | 7/2000 | Djoko et al. | 714/26 |
| 6,308,064 | B1 * | 10/2001 | Green | 455/423 |
| 6,567,669 | B1 * | 5/2003 | Groome | 455/456.6 |
| 7,123,928 | B2 * | 10/2006 | Moeglein et al. | 455/456.3 |
| 7,319,875 | B2 * | 1/2008 | Brand et al. | 455/456.1 |
| 7,885,651 | B2 * | 2/2011 | Akihara | 455/423 |
| 2002/0164982 | A1 | 11/2002 | Ikeda et al. | |
| 2004/0166902 | A1 * | 8/2004 | Castellano et al. | 455/562.1 |
| 2005/0020309 | A1 * | 1/2005 | Moeglein et al. | 455/561 |
| 2006/0276202 | A1 * | 12/2006 | Moeglein et al. | 455/456.1 |
| 2009/0047973 | A1 * | 2/2009 | MacNaughtan et al. | 455/456.1 |
| 2009/0312034 | A1 * | 12/2009 | Burroughs et al. | 455/456.1 |

(Continued)

FOREIGN PATENT DOCUMENTS

EP 1 206 147 5/2002

(Continued)

OTHER PUBLICATIONS

Lucent Technologies:, "Self-configuration and self-optimization in E-UTRAN", 3GPP Draft; R3-061482 LTE Self, 3RD Generation Partnership Project (3GPP), Mobile Competence Centre ; 650, Route Des Lucioles ; F-06921 Sophia-Antipolis Cedex ; France, vol. RAN WG3, No. Seoul, Korea; 20061005, Oct. 5, 2006, XP050160370; [Ref.: EESR dated Jun. 29, 2011].

(Continued)

*Primary Examiner* — Minh D Dao
(74) *Attorney, Agent, or Firm* — Myers Wolin, LLC

(57) ABSTRACT

A mobile communication system that establishes a link between a plurality of base stations in which an adjacency condition is satisfied. The mobile communication system including a first base station that transmits a broadcast packet including its own location information and radius information of a wireless service area. Also included is a second base station that determines the adjacency condition between the wireless service areas based on the location information of the first base station and the radius information of the wireless service area, included in the packet received from the first base station, and the second base station's location information and the radius information of the wireless service area. The link is preferably established between the first and second base stations in which the adjacency condition is satisfied.

12 Claims, 9 Drawing Sheets

U.S. PATENT DOCUMENTS

| | | | | |
|---|---|---|---|---|
| 2010/0048218 A1* | 2/2010 | Gale et al. | ............ | 455/450 |
| 2010/0309057 A1* | 12/2010 | Edge et al. | ............ | 342/451 |
| 2011/0018766 A1* | 1/2011 | Steer et al. | ............ | 342/368 |
| 2011/0021205 A1* | 1/2011 | Horneman et al. | ............ | 455/450 |

FOREIGN PATENT DOCUMENTS

| | | |
|---|---|---|
| EP | 2 104 284 | 9/2009 |
| JP | 1998-191442 | 7/1998 |
| JP | 2002-209275 | 7/2002 |
| JP | 2003-143069 | 5/2003 |
| JP | 2005-277507 | 10/2005 |
| WO | 2008/087833 | 7/2008 |

OTHER PUBLICATIONS

Nokia:, "Self-Configuration and Self-Optimization of Neighbor Cell Lists", 3GPP Draft; R3-061758, 3RD Generation Partnership Project (3GPP), Mobile Competence Centre ; 650, Route Des Lucioles ; F-06921 Sophia-Antipolis Cedex ; France, vol. RAN WG3, No. Riga, Latvia; 20061101, Nov. 1, 2006, XP050160644; [Ref.: EESR dated Jun. 29, 2011].

Extended European Search Report with Written Opinion, issued for corresponding European Patent Application No. 08161699.7, dated Jun. 29, 2011.

Lucent Technologies, Self-configuration and self-optimization in E-UTRAN, R3-061482, 3GPP TSG RAN WG3 Meeting #53bis, Seoul, Korea, Oct. 10th-13th, 2006.

Japanese Patent Office "Notice of Reasons for Rejection" issued for corresponding Japanese Patent Application No. 2007-205744, mailed Dec. 13, 2011. English translation attached.

\* cited by examiner

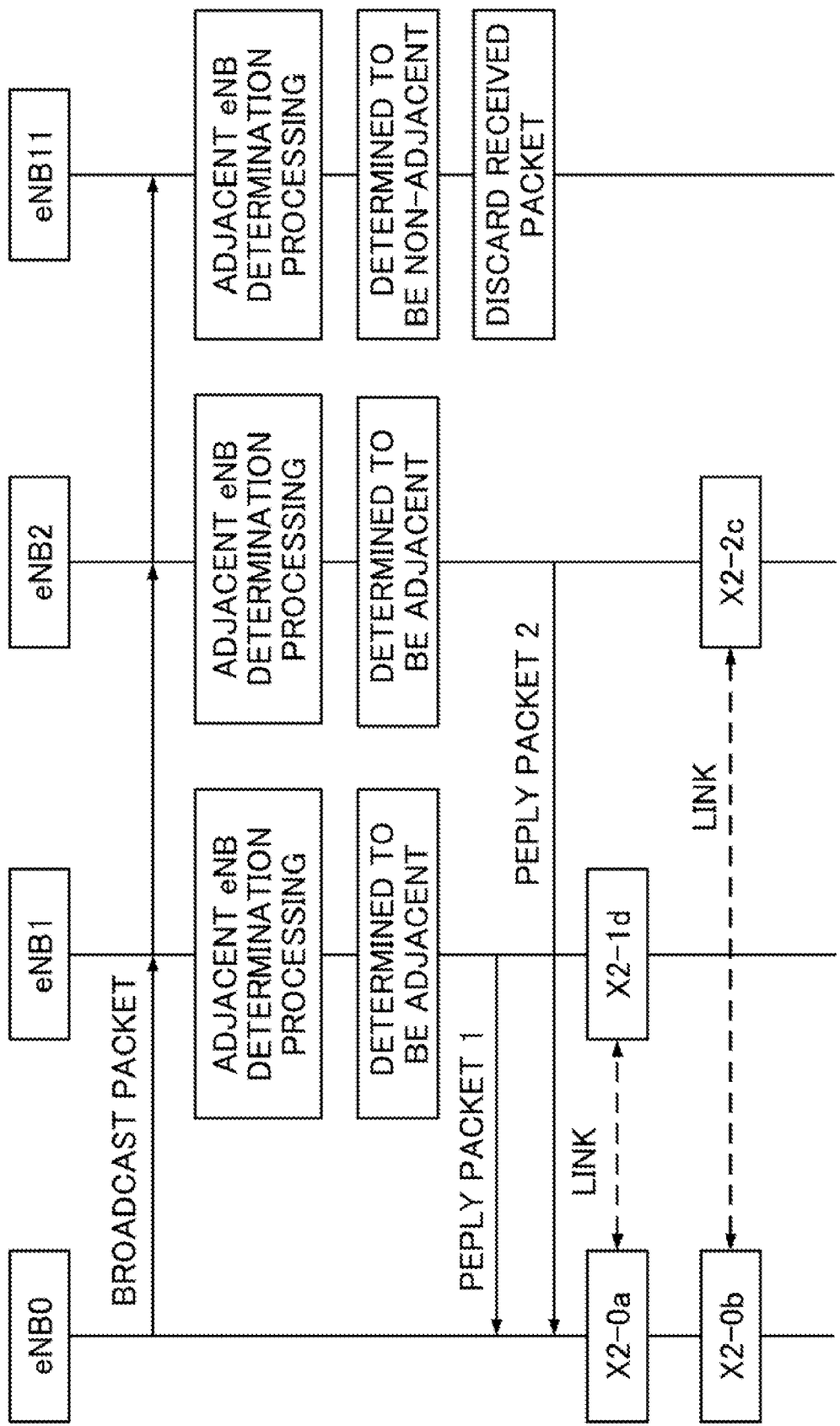

FIG. 3A

| TRANSMISSION SOURCE LOCATION INFORMATION | DIRECTION 1 IP ADDRESS FOR TRANSMISSION IP ADDRESS | DIRECTION1 SECTOR a RADIUS | DIRECTION 2 IP ADDRESS FOR TRANSMISSION SOURCE X2 | DIRECTION2 SECTOR RADIUS | ... | DIRECTION 6 IP ADDRESS FOR TRANSMISSION SOURCE X2 | DIRECTION6 SECTOR RADIUS |
|---|---|---|---|---|---|---|---|

| DESTINATION MAC ADDRESS (BROADCAST) | TRANSMISSION SOURCE MAC ADDRESS | DESTINATION IP ADDRESS (BROADCAST) | TRANSMISSION SOURCE IP ADDRESS | DATA PART | F C S |
|---|---|---|---|---|---|

FIG. 3B

| DESTINATION MAC ADDRESS | TRANSMISSION SOURCE MAC ADDRESS | DESTINATION IP ADDRESS | TRANSMISSION SOURCE IP ADDRESS | TRANSMISSION SOURCE LOCATION INFORMATION | IP ADDRESS FOR TRANSMISSION SOURCE X2 | F C S |
|---|---|---|---|---|---|---|

FIG. 4B

| OWN DIRECTION (SECTOR) | IP ADDRESS FOR ITS OWN X2IF | MAC ADDRESS FOR ITS OWN X2IF | IP ADDRESS FOR OPPOSITE X2IF | MAC ADDRESS FOR OPPOSITE X2IF |
|---|---|---|---|---|
| 1 | 0a | ○○ | 1d | △△ |
| 2 | 0b | ○○ | 2e | △△ |
| 3 | 0c | ○○ | 3f | △△ |
| ‥ | ‥ | ‥ | ‥ | ‥ |
| 6 | 0f | ○○ | 6c | △△ |

LINK ESTABLISHMENT METHOD AND MOBILE COMMUNICATION SYSTEM

CROSS REFERENCE TO RELATED APPLICATIONS

The present invention claims priority to Japanese Patent Application No. JP 2007-205744, filed Aug. 7, 2007, the entirety of which is incorporated herein by reference.

BACKGROUND

1. Technical Field

The present invention relates to a mobile communication system and a link establishment method, more specifically to the mobile communication system and the link establishment method for establishing a link of an X2 interface based on a 3GPP specification between a plurality of base stations connected to an IP network.

2. Description of the Related Art

LTE (Long Term Evolution), discussed in 3GPP (3rd Generation Partnership Project), is a next step developed from an HSDPA (High Speed Downlink Packet Access) which is currently in service, or of an HSUPA (High Speed Uplink Packet Access) which is discussed to be in service in a later stage, and is also referred to as S3G (Super 3G) or EUTRA(N) (Evolved UMTS Terrestrial Radio Access (Network)). The characteristic is to reduce packet transmission delay and to provide a high speed data system in which the packet is optimized.

In a wireless communication system based on 3GPP-LTE, instead of a combination of a wireless control device (RNC: Radio Network Controller) of an existing 3G system and a basestation device (Node B), an enhanced Node B (hereinafter referred to as eNB) is added. In addition, a new communication interface (hereinafter referred to as X2 interface) is added for providing a connection between the eNBs. The reason for the addition is that a user (U-Plane) signal and a control (C-Plane) signal are directly transferred via the X2 interface during a handover between adjacent eNBs.

FIG. 8 is a diagram showing a configuration example of the mobile communication system based on the 3GPP specification. In FIG. 8, "S1IF" indicates an S1 interface, and "X2IF" indicates an X2 interface. This system includes a mobile stations (MS), a base stations (eNB), a router, not shown in the figure, which configures an IP network 100, an access gateway (aGW) and the like. Each node (eNB, router, aGW and the like) is connected to each other with, for example, a wired IP line in order to transmit the U-Plane signal and the inter-station control (C-Plane) signal with call processing.

In the system based on 3GPP-LTE, the interface between the IP network (core network) and the eNB is defined as an S1 interface, and the interface between the eNBs is defined as an X2 interface. The existing system did not have the X2 interface. The X2 interface is newly added in the 3GPP-LTE in order to transfer the U-Plane signal and the C-Plane signal during handover. Another difference from the existing system is that a GPS (Global Positioning System) receiving unit 11 is implemented on each eNB. According to such configuration, the IP network 100 is connected to each eNB via the S1 interface. In addition, a link of the X2 interface has to be established between all the adjacent eNBs performing the handover.

The mobile communication system is known, in which a plurality of base stations each inform their own system information to each other by a multicast packet. In addition, the mobile communication system is capable of broadcasting broadcast information to a mobile station without a wireless control device (RNC) by forming the broadcast information autonomously and distributively in each base station, for example see Japanese Laid-Open Patent Publication No. 2002-209275.

SUMMARY

According to an exemplary embodiment, a mobile communication system that establishes a link between a plurality of base stations in which an adjacency condition is satisfied, the mobile communication system including a first base station that transmits a broadcast packet including location information of an own station and radius information of a wireless service area. Also included is a second base station that determines the adjacency condition between the wireless service areas based on the location information of the first base station and the radius information of the wireless service area, included in the packet received from the first base station, and the location information of the own station and the radius information of the wireless service area. The link is preferably established between the first and second base stations in which the adjacency condition is satisfied.

BRIEF DESCRIPTION OF THE DRAWINGS

FIG. 2 is an example sequence diagram of link establishment processing between adjacent eNBs according to an embodiment;

FIGS. 3A and 3B are example diagrams illustrating a packet format according to an embodiment;

FIGS. 4A and 4B is an example flowchart (1) and table of link establishment processing between the adjacent eNBs according to an embodiment;

DETAILED DESCRIPTION OF THE EMBODIMENTS

Figure 1:
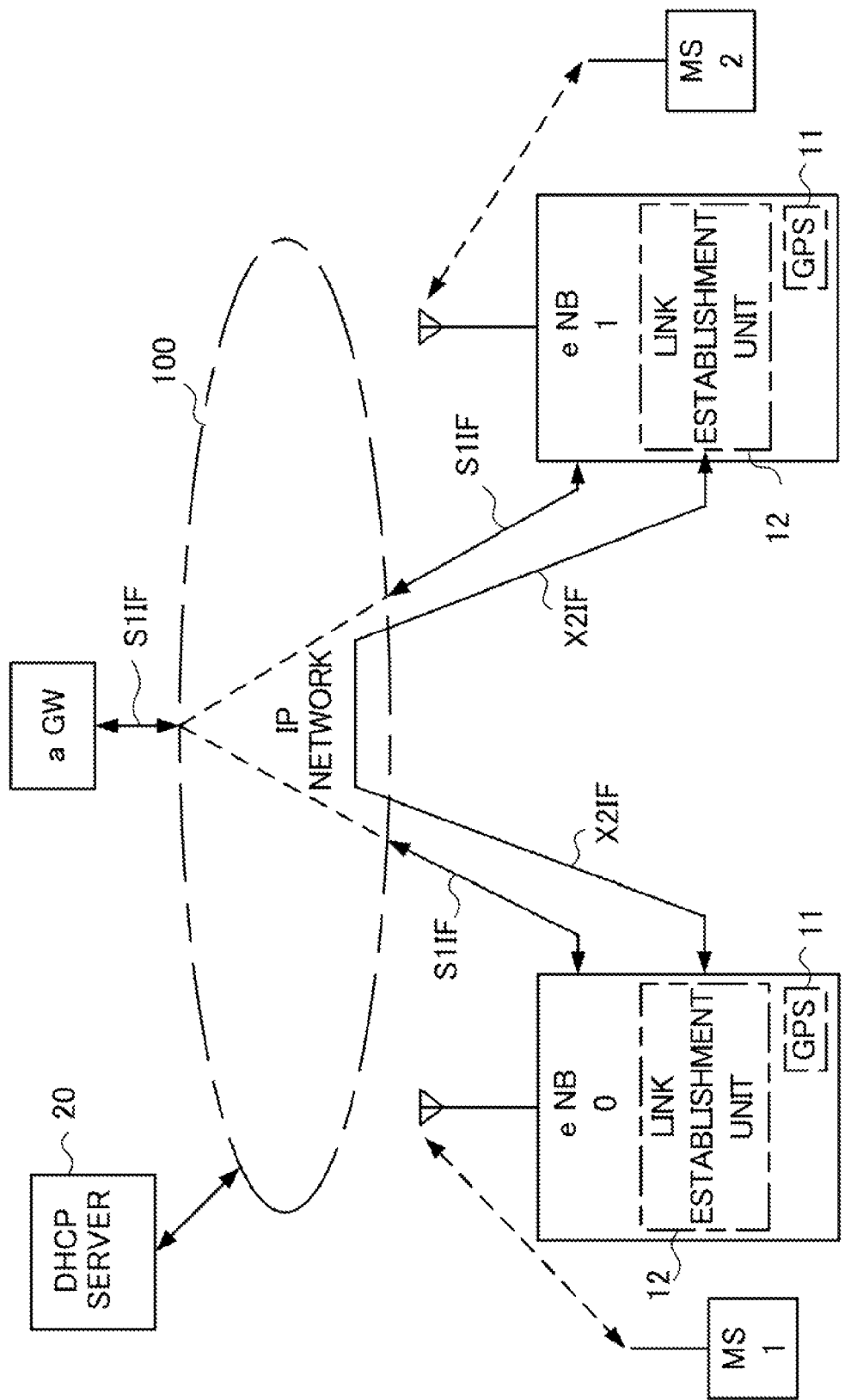
FIG. 1 is an example diagram showing a network configuration of a mobile communication system according to an embodiment.

Hereinafter, embodiments of the system will be described with reference to the accompanying drawings. However, the system is not limited to the embodiments described below, and various modifications can be implemented without departing from the spirit of the system.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 8:
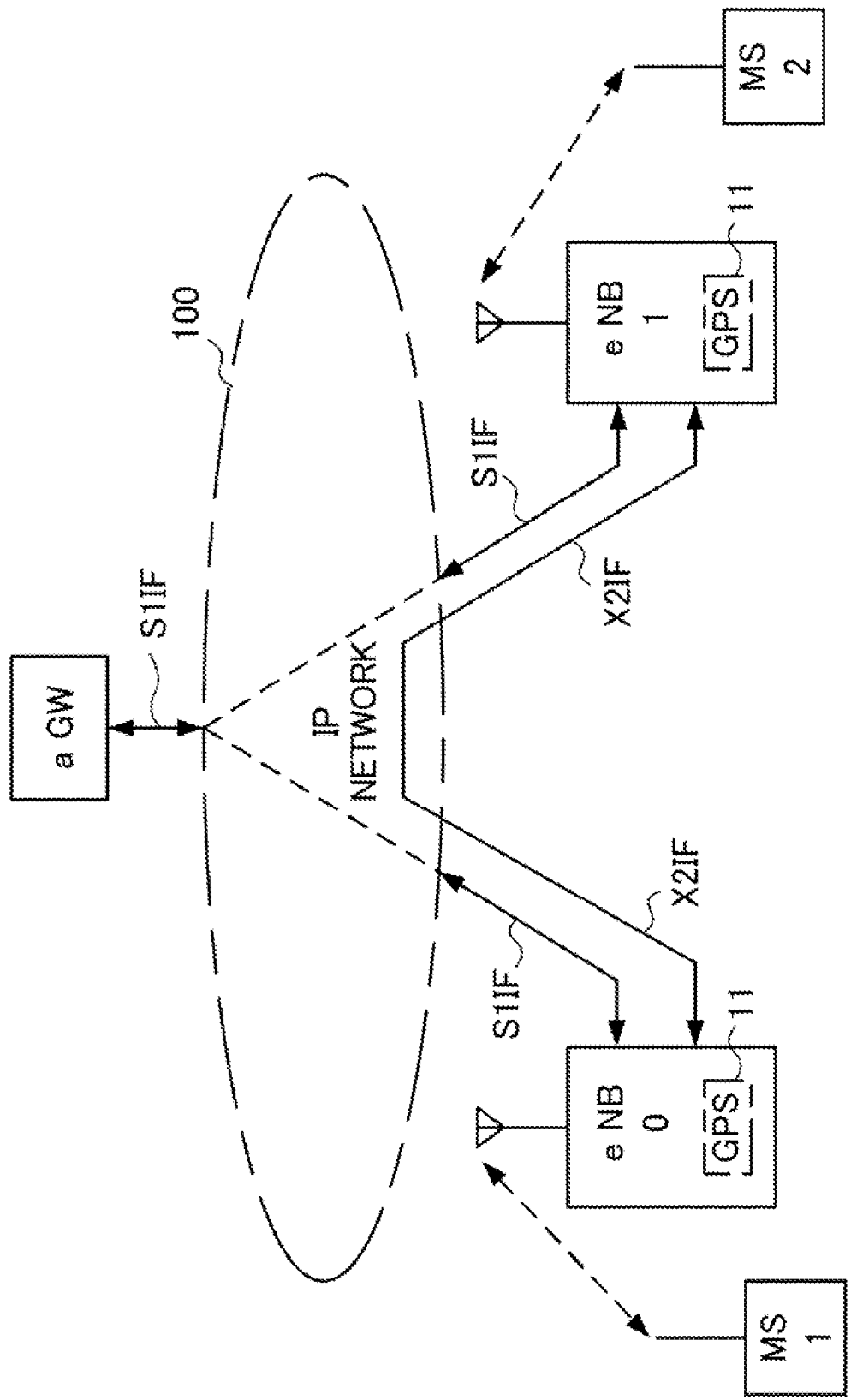
FIG. 8 is a diagram showing a configuration example of the mobile communication system based on the 3GPP specification.

FIG. 1 is an example diagram showing a network configuration of a mobile communication system according to an embodiment. As described in FIG. 8, this system basically includes a mobile stations (MS), a base stations (eNB), a router, not shown in the figure, which has an IP network 100, an access gateway (aGW) and the like. Each node (eNB, router, aGW and the like) is connected with, for example, a wired IP line in order to transmit a user (U-Plane) signal and an inter-station control (C-Plane) signal with call processing. Each of an eNB0 and an eNB1 has a link establishment unit 12 which automatically establishes a link of the X2 interface. Moreover, the IP network 100 is connected to a DHCP (Dynamic Host Configuration Protocol) server 20 which performs automatic setting of IP addresses.

The setting of the IP addresses which are needed for the S1 interface and the X2 interface of each eNB can be performed manually by an operator, but the present embodiment uses the DHCP server 20. Therefore, the setting (plug and play) of the IP addresses and the like needed for TCP/IP communication is performed automatically by just physically connecting a newly established station eNB0 (i.e., a DHCP client) to the network.

The IP address setting operation is described byway of example of connecting a newly established station eNB0. An IP address, a sub-netmask, a default route and the like which are needed to be allocated to each eNB in DHCP processing are set to the DHCP server 20 in advance. To use the DHCP server 20, first, the eNB0 (DHCP client) transmits a "DHCP discover packet," in which a source IP address is set to undetermined "0.0.0.0," to the DHCP server 20 and requires setting information of the network, such as a necessary number of IP addresses (including the IP address for the X2 interface) and netmasks. Receiving the DHCP discover packet, the DHCP server 20 transmits a "DHCP provision packet" to inform the network settings which can be used in the eNB0.

Furthermore, receiving the DHCP discover packet, the eNB0 transmits a "DHCP request packet," in which the source IP address is set to undetermined "0.0.0.0," to the DHCP server 20 to inform the DHCP server 20 that the eNB0 wants to use the informed settings. Then, receiving the DHCP request packet, the DHCP server 20 transmits back a "DPCH confirmation answer packet" to notify permission to the eNB0 in response to the request of the setting that the eNB0 wants to use. Therefore, the setting of the network is completed, so that TCP/IP communication becomes possible. Moreover, use of the obtained IP address for the X2 interface makes it possible to establish the link between adjacent eNBs as described below.

FIG. 2 is an example sequence diagram of link establishment processing between adjacent eNBs according to an embodiment. Description is made of an overview of the link establishment operation in accordance with FIG. 2. The eNB0 (newly established station) transmits a broadcast packet shown in FIG. 3A described below to all of the eNBs to discover MAC addresses and IP addresses for the X2 interface of the adjacent eNBs.

In eNB1 and eNB2, after receiving the broadcast packet, calculation and determining processing of an adjacency condition are performed according to an adjacent eNB determination flowchart shown below in FIG. 5. In this example, a reply packet shown in FIG. 3B is transmitted to the eNB because it is determined that these eNBs are adjacent each other. On the other hand, an eNB11 (see FIG. 2) at a distance is not determined to be adjacent, the received broadcast packet is discarded, and the reply packet is not transmitted. Since the eNB0 receives the reply packet only from eNB1 and eNB2, an X2 interface link is established between eNB0 (X21P=0a) and eNB1 (X2IP=1d) and between eNB0 (X21P=0b) and eNB2 (X21P=2c).

FIGS. 3A and 3B are example diagrams illustrating a packet format according to an embodiment. FIG. 3A shows the format of a broadcast packet transmitted from the newly established eNB. A destination MAC address in a data link layer is loaded with the broadcast address. There are two kinds of broadcast addresses. One is a local broadcast address limited to the broadcast in the link to which the a station belongs. The other is a direct broadcast address which specifies a different network to broadcast to all the stations in the link thereof. In the present embodiment, either broadcast address can be used. On the other hand, a destination IP address in a network layer is loaded with the broadcast address, and the source IP address is loaded with the IP address for the S1 interface of the its own station (eNB0).

Furthermore, a data part includes location information (obtained by a GPS11) of a source station eNB0, the source IP address for the X2 interface which is set in each direction (sector) of a wireless service area of its own station, and a sector radius of such direction. In this example, pairs of IP addresses for the X2 interface and the sector radi uses for six sectors are loaded. In each station, if a standard of direction is determined to be north, for example, each neighboring station allocates the received IP address for the X2 interface to a correct direction, respectively, on condition that a sector 1 is allocated to the north. In this case, if the neighboring eNB receives six IP addresses for the X2 interface in total, the angle per sector is estimated to be 60 degrees. If the neighboring eNB receives nine IP addresses for the X2 interface in total, the angle per sector can be estimated to be 40 degrees.

In the embodiment described above, the radius of each sector is transmitted, but the embodiment is not limited to the radius. When the wireless service area is a circle, an effective size of the wireless service area can be expressed properly by informing a single cell radius. The cell radius depends on a range of transmission of a radio wave (setting of transmission electric power) and is common to the cell normally. Meanwhile, when the range of the radio wave is set to each sector by using a plurality of directional antennas or array antennas, the sector radius depends on the transmission electric power of each sector.

The MAC address in the data link layer is needed to establish the X2 interface link between the eNBs, so that the MAC address, set to each source IP address for the X2 interface described above, can be loaded to the broadcast packet.

FIG. 3B shows the format of the reply packet transmitted from each adjacent eNB. The destination MAC address is loaded with a source (eNB0) MAC address of the received broadcast packet, and the source MAC address is loaded with the MAC address of its own station (e.g., eNB1). The destination IP address is loaded with the source (eNB0) IP address of the received broadcast packet. The source IP address is loaded with the IP address of its own station (eNB1). Further, the data part is loaded with the location information (obtained by the GPS11) of its own station (eNB1) and the source IP address for the X2 interface.

This reply packet can be loaded with the sector radius (or the cell radius) of the source station (eNB1). Thus, it is possible to perform confirmation determination of the adjacency condition at a receiving side (eNB0).

Moreover, in the eNB0, by using the location information of the two stations, i.e., the eNB0 and the eNB1, the line connecting the two stations can be assumed. Further, by using the direction of the line, it is possible to determine which direction of the IP address for the X2 interface has to be corresponded to the IP address for the X2 interface of its own station (eNB0) loaded on the received reply packet.

Otherwise, in the adjacent eNB1, the IP address for the X2 interface of its own station (eNB1) can be combined with the IP address for the X2 interface which is informed from the eNB0 by the broadcast, and the two IP addresses can be loaded as a pair on the reply packet. This makes it possible to make the IP address for the X2 interface of the adjacent station (eNB1) correspond to the IP address for the X2 interface of its own station (eNB0) without obtaining the direction of the eNB1 at the eNB0 side.

Further, it is possible to make the MAC address correspond to the IP address for the X2 interface of its own station (eNB1) loaded on the reply packet before transmitted.

Figure 4A:
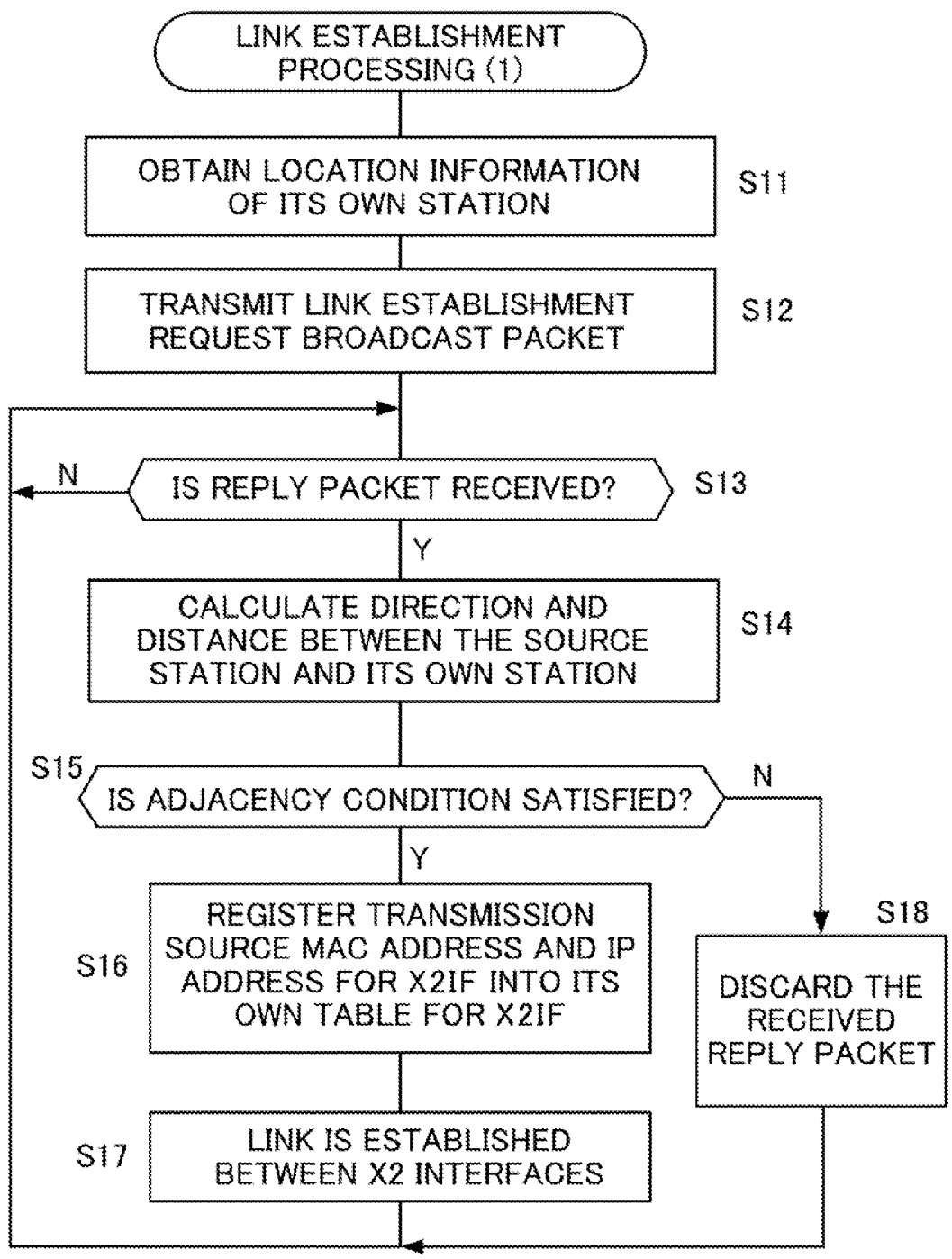
Figure 5:
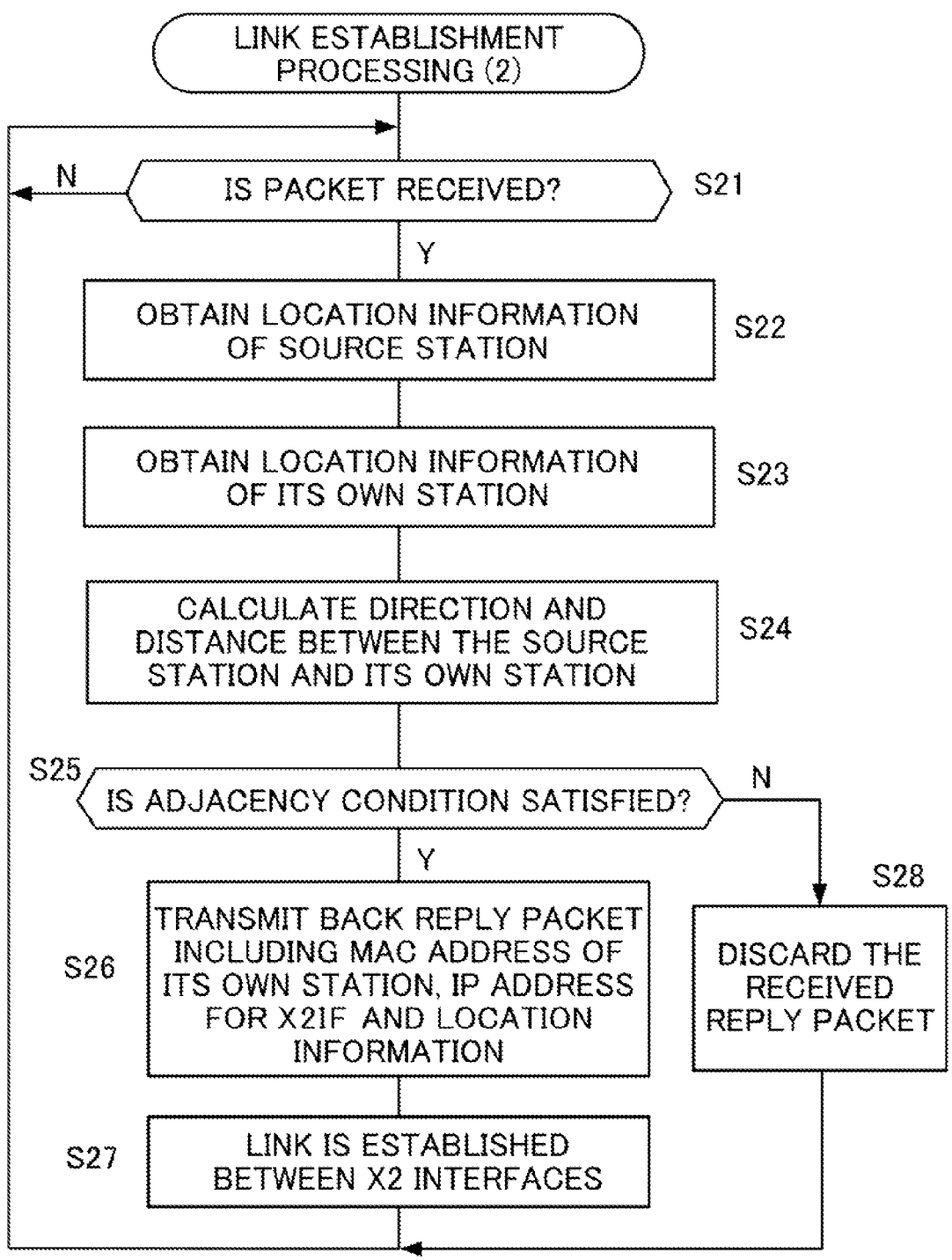
FIG. 5 is an example flowchart (2) of link establishment processing between the adjacent eNBs according to an embodiment.

FIGS. 4A 4B and FIG. 5 are flow charts (1) and (2) and table of link establishment processing between the eNBs according to an embodiment. FIG. 4A shows the link establishment processing (1) in the newly established eNB0. In step S11, the location information of its own station is obtained by GPS11. In step S12, a link establishment request broadcast packet of the X2 interface is transmitted. In step S13, receiving the reply packet from the adjacent eNB is awaited. If the reply packet is received, in step S14, a direction and a distance between its own station (eNB0) and the source station (eNB1) are calculated by using the location information of the source station (e.g., eNB1) of the received packet. An example of this calculation processing is described later in accordance with FIG. 6.

In step S15, it is determined (confirmed) whether or not the adjacency condition is satisfied. If YES, the process goes to step S16 to store the IP address for the X2 interface transmitted from the source station (eNB1) and the MAC address corresponding to such IP address into a table for the X2 interface of its own station shown in FIG. 4B. In step S17, the X2 interface link is established between eNB0 and eNB1. Further, if the adjacency condition is not satisfied in the determination in step S15 described above, the received reply packet is discarded in step S18. Since usually only the adjacent eNB transmits the reply packet, the processing of step S18 is processing for discarding the packet other than the reply packet which intrudes into the reception for any reason. FIG. 4B shows a table for the X2 interface (IF). The table has a registration field for each item for service directions (sector) 1 to 6 of its own station (eNB0). The IP address and the MAC address for the X2 interface which are informed from the adjacent station are registered in the field corresponding to the IP address and the MAC address for the X2 interface of its own station.

FIG. 5 shows link establishment processing (2) in the neighboring eNB1 and the like. In step S21, receiving the broadcast packet of the link establishment request is awaited. If the broadcast packet of the link establishment request is received, the location information of the source station eNB0 is obtained from the received packet in step S22. In step S23, the location information (obtained by the GPS11) of its own station (e.g., the eNB1) is obtained. In step S24, the direction and the distance between the source station eNB0 and its own station eNB1 is calculated. An example of this calculation processing is described later in accordance with FIG. 6.

In step S25, it is determined whether or not the adjacency condition is satisfied. If YES, the process goes to step S26 to transmit back the reply packet loaded with the location information of its own station eNB1, the IP address for the X2 interface allocated to the direction of the eNB0, and the MAC address corresponding to the IP address. In step S27, the X2 interface link is established between eNB0 and eNB1. In the determination in step S25 described above, if the adjacency condition is not satisfied, the process goes to step S28, and the received broadcast packet is discarded.

Figure 6:
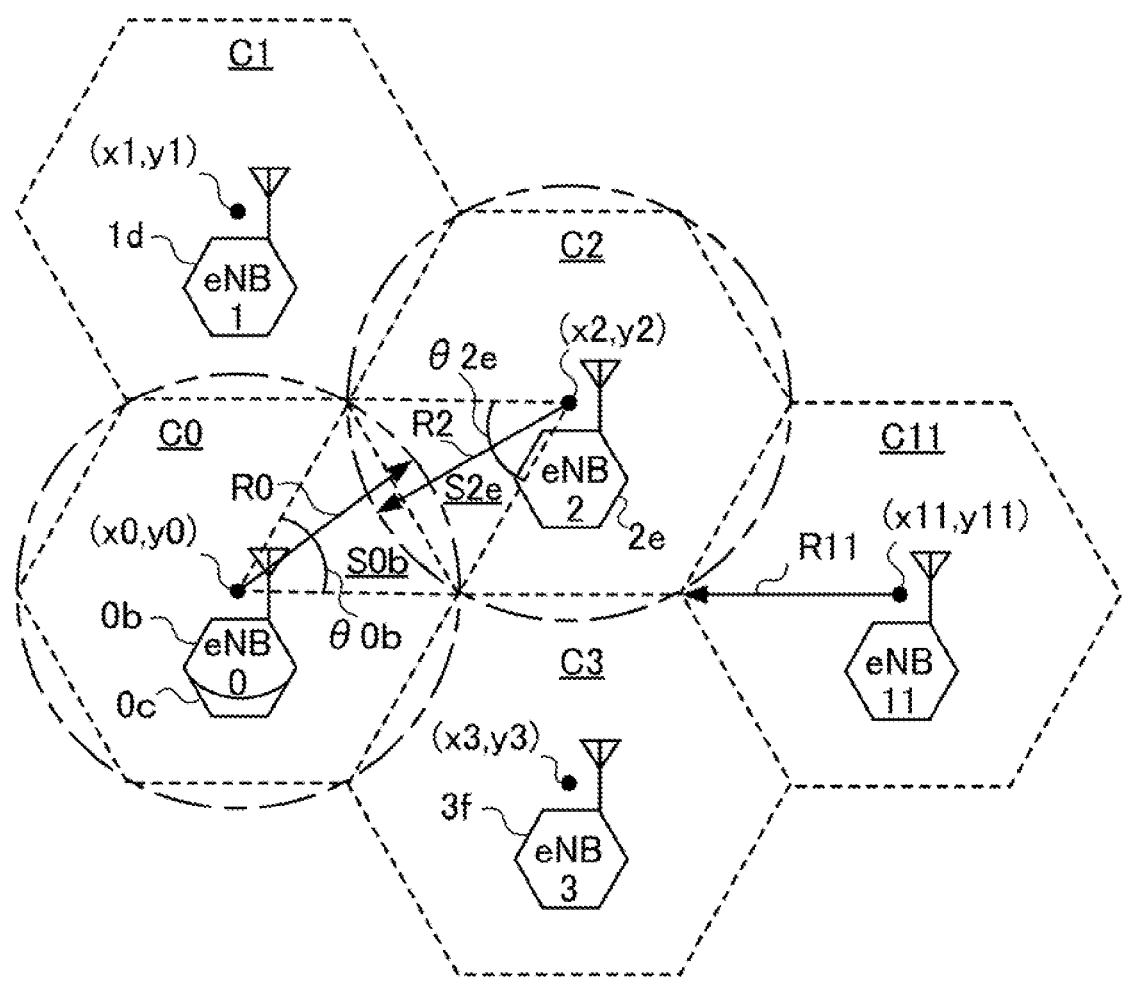
FIG. 6 is an example image diagram of adjacency condition determination processing according to an embodiment.

FIG. 6 is an example image diagram of adjacency condition determining processing according to an embodiment. For example, if the adjacency condition is determined between the newly-established station eNB0 and a neighboring station eNB2, the distance between the two points is calculated as follows.

$L=\sqrt{\{(x2-x0)^2+(y2-y0)^2\}}$ is first calculated based on the location information (x0, y0) of eNB0 and the location information (x2, y2) of eNB2. In addition, the direction between eNB0 and eNB2 can be known to each other by this line L. Next, it is determined whether or not each sectoral area, obtained by a cell radius R0 of eNB0 and a cell radius R2 of eNB2, overlaps more than a predetermined range. Specifically, when a straight line connecting the two stations is cut off by both the cell radius R0 and the cell radius R2, if the length of the line intersecting the obtained common area exceeds a predetermined threshold value, the two stations can be determined to be adjacent. The condition of such overlap area can be determined depending on a request condition of the handover. In this example, eNB2 is determined to be an adjacent station of the newly established station eNB0. In the same manner, eNB1, eNB3 and the like are determined to be adjacent stations of eNB0. However, an eNB11 at a distance is determined to be a non-adjacent station because the adjacency condition is not satisfied. The adjacency condition between the sectors can be determined in the same way.

In the example of FIG. 6, the adjacency condition is described by using, but not limited to, two-dimensional location information. However, the adjacency condition can be determined by using three-dimensional location information. This makes it possible to perform detailed adjacent determination based on an actual network allocation (geography and the like).

Figure 7:
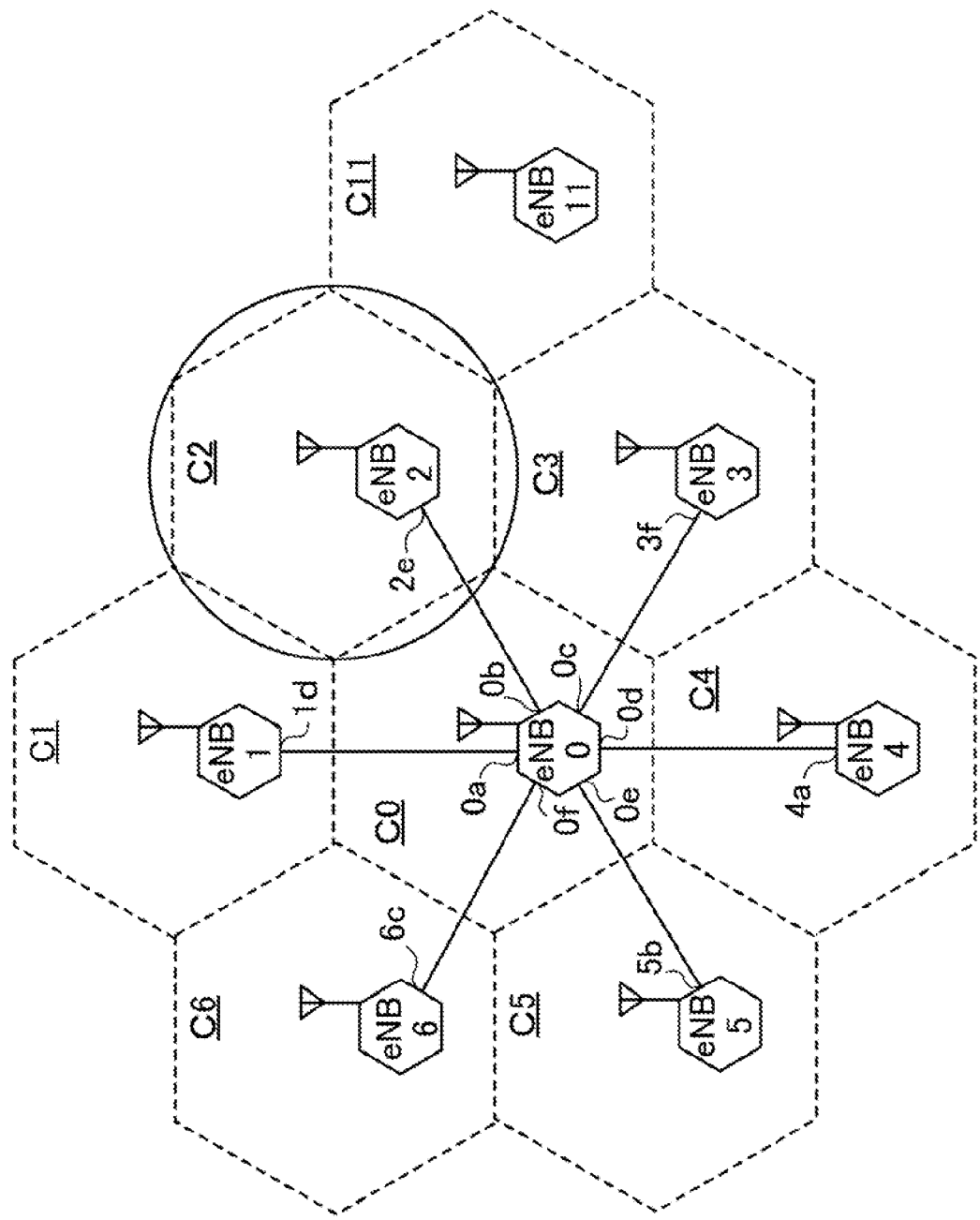
FIG. 7 is an example image diagram of a link establishment state between the adjacent eNBs according to an embodiment.

FIG. 7 is an example image diagram of a link establishment state between adjacent eNBs according to an embodiment. Under a cellular communication system, a large area is divided by hexagonal shaped cells C0 to C6, C11 and the like, and the eNB0 to eNB6, and an eNB11 are located in a center of the cell. This makes it possible to perform service on a large area by the wireless service area of each cell, leaving no space therein. Further, each of the eNBs is connected by the S1 interface which is not shown in the figure, and every link of all of the X2 interface is automatically established between the adjacent eNBs performing the handover. In this example, it is determined that the neighboring stations eNB1 to eNB6, scattered surrounding a circumference of the newly established station eNB0, are adjacent stations. Between these stations, the X2 interface link is automatically established. For example, X2IP=0a of eNB0 and X2IP=1d of eNB1 establish the link, and X2IP=0b of eNB0 and X2IP=2e of eNB2 establish the link. Even though not shown in the figure, much the same is true on the MAC address. In addition, much the same is true in the other adjacent eNBs, and this connection relation is registered in the table for the X2 interface of FIG. 4B. Meanwhile, the eNB11 at a distance, for example, is determined to be a non-adjacent station. As a result, the X2 interface link is not established.

In the embodiment described above, the newly established eNB0 transmits the broadcast packet of FIG. 3A. However, this embodiment is not limited to the broadcast packet. If the IP address of the neighboring stations surrounding the eNB0 is known, the multicast packet designated to the IP address can be transmitted.

In the embodiment described above, the large service area is divided into hexagonal cells. However, this embodiment is not limited to a hexagonal shape. An arbitrary polygonal shape is applicable as a cell shape.

According to the above-described embodiments, the maintenance work such as setting or changing of the IP address for establishing the link is automated, so that it becomes easier to design the network and to set the eNB.

Although the embodiment has been described with reference to particular embodiments, it will be understood to those skilled in the art that the invention is capable of a variety of alternative embodiments within the spirit of the appended claims. Moreover, not all disclosed aspects need to be included in any single embodiment.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What is claimed is:

1. A link establishment method of a mobile communication system that establishes a link between a plurality of base stations, comprising:
    transmitting, by a first base station, a broadcast packet including the first base station's location information and radius information of a wireless service area;
    determining, by a second base station that received the broadcast packet, an adjacency condition between wireless service areas of the first and second base stations based on location information of the second base station and the radius information of each sector in which its own wireless service area is divided in each direction; and
    establishing a link between the first and second base stations in which the adjacency condition is satisfied.

2. The method of claim 1, wherein the second base station determines that the adjacency condition is satisfied when the adjacent sectors lie over each other on a line which connects the first base station to the second base station.

3. The method of claim 2, wherein the second base station transmits back a reply packet including the its own location information and an IP address used to establish a link between the second base station and the first base station when the adjacency condition is satisfied.

4. A mobile communication system that establishes a link between a plurality of base stations in which an adjacency condition is satisfied, the mobile communication system comprising:
    a first base station that transmits a broadcast packet including its own location information and radius information of a wireless service area; and
    a second base station that determines an adjacency condition between wireless service areas of the first base station and the second base station based on the location information of the first base station and the radius information of the wireless service area, included in the packet received from the first base station, and location information of the second base station and the radius information of the wireless service area,
        wherein the link is established between the first and second base stations in which the adjacency condition is satisfied.

5. The mobile communication system according to claim 4, wherein the second base station determines that the adjacency condition is satisfied when the adjacent sectors lie over each other on a line which connects the first base station to the second base station.

6. The mobile communication system according to claim 5, wherein the second base station transmits back a reply packet including its own location information and an IP address used to establish a link between the second base station and the first base station when the adjacency condition is satisfied.

7. The mobile communication system according to claim 6, wherein the reply packet includes the MAC address set to correspond to the IP address of the second base station.

8. The mobile communication system according to claim 5, wherein the second base station discards the received packet when the adjacency condition is not satisfied.

9. The mobile communication system according to claim 4, wherein the first and second base stations each have a plurality of IP addresses that are set to each direction of the wireless service area for each station, and the first and second base stations establish the link by using the IP address in an opposite direction to each other.

10. The mobile communication system according to claim 4, wherein the broadcast packet includes an IP address that is set to each direction of its own station.

11. The mobile communication system according to claim 4, wherein the broadcast packet includes a MAC address set to correspond to the IP address of its own station.

12. A mobile communication system that establishes a link between a plurality of base stations, in which an adjacency condition is satisfied, the mobile communication system comprising:
    a first base station that transmits a broadcast packet including its own location information and radius information of each sector in which a wireless service area of the first base station is divided in each direction; and
    a second base station that determines an adjacency condition between the sectors based on the second base station's location information and radius information of each in which its own wireless service area is divided in each direction,
    wherein the link is established between the first and second base stations in which the adjacency condition is satisfied.

* * * * *